Oct. 6, 1942.  T. JOHNSEN  2,298,014
NUT LOCKING DEVICE
Filed June 14, 1939
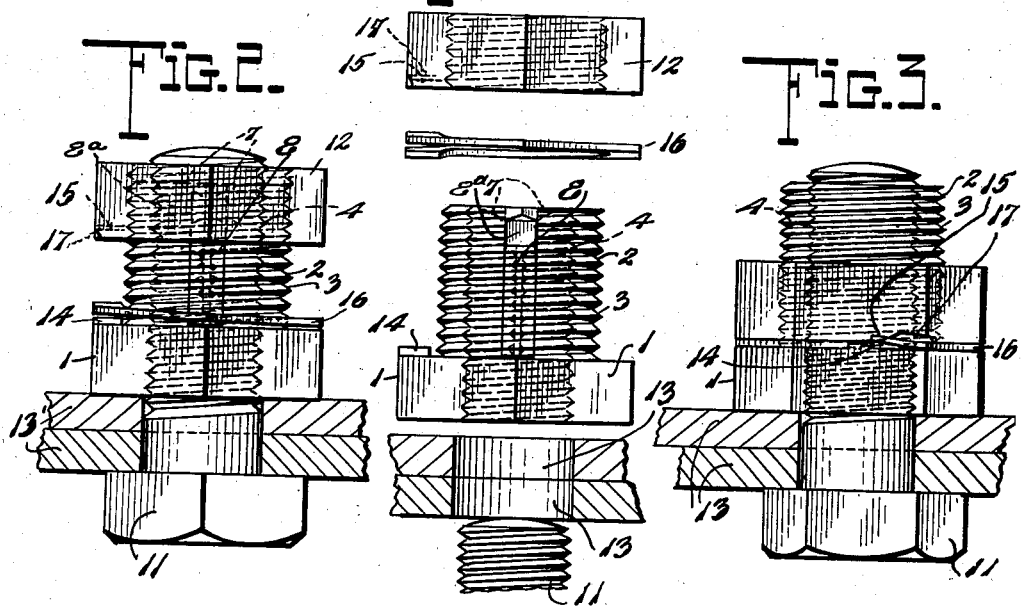
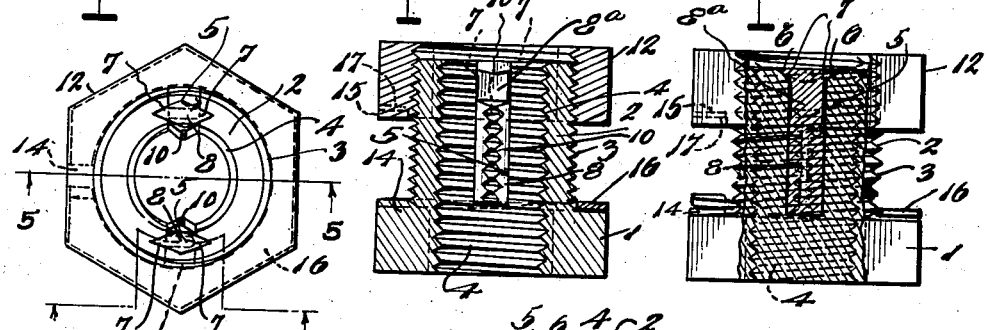
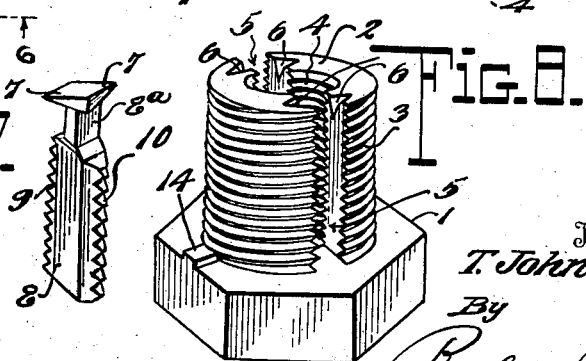
Inventor
T. Johnsen
By
Robb & Robb
Attorneys Patented Oct. 6, 1942

2,298,014

UNITED STATES PATENT OFFICE 2,298,014

NUT LOCKING DEVICE

Tobias Johnsen, Kirkland Lake, Ontario, Canada

Application June 14, 1939, Serial No. 279,211

8 Claims. (Cl. 151—23)

The present invention relates to improvements in locknuts, the primary object of which is to provide a novel means for more or less permanently securing a nut in any locking position without the use of the well known cotter pin construction.

In carrying out the invention, I provide a special form of nut having a supporting extension for a swingable member or members constructed and arranged to interlockingly engage with the threads of a bolt under the urge of a clamping nut mounted upon said extension.

It is further an object in view to provide means for establishing an interlock between the main or primary nut and the associated clamping nut used therewith, whereby the latter is normally maintained against displacement once the locking position of the members has been reached.

Other and further objects and advantages of the invention will be hereinafter set forth and the novel features thereof defined by the appended claims.

In the drawing:

Figure 1 is a view in elevation of the several parts constituting the locking device of this invention in separated position;

Figure 2 is a similar view showing said parts assembled upon a bolt, and preliminary to the establishment of the locking action;

Figure 3 is a view similar to Figure 2 showing the position assumed by the parts when adjusted to the locking position;

Figure 4 is a top plan view of the locking device.

Figure 5 is a vertical sectional view on the plane indicated by line 5—5 of Figure 4;

Figure 6 is a sectional view taken about on the plane indicated by line 6—6 of Figure 4;

Figure 7 is a detailed perspective view of the bolt locking wedge or lug; and

Figure 8 is a perspective view of the primary nut and its threaded extension.

Like reference characters designate corresponding parts in the several figures of the drawing.

Referring to the drawing, and particularly to Figures 7 and 8, the locking device of this invention comprises the nut 1 having a supporting extension 2 projecting from its outer face. This extension is threaded both exteriorly, as indicated at 3, to receive a clamping nut hereinafter referred to, and interiorly, as at 4, to receive the bolt. The extension, furthermore, is provided with diametrically opposed slots 5 at the top of each of which the side walls are notched, at 6, to provide seats to receive the ears 7 of locking wedges or lugs 8. The form of the projections 7 is such as to constitute pivot supports for the lugs, permitting them to swing transversely of the nut in their respective slots, and these lugs are wider at their lower ends in the direction of their dimension from outside to inside for reasons hereinafter more particularly pointed out. Each of the lugs is formed with a thin resilient neck portion 8a immediately under the head formed by the oppositely extending ears 7—7, and immediately under the neck portion it is provided on its outer face with threads 9 which conform to the threads 3 on the outer face of the extension 2. The inner wall is beveled inwardly to provide a narrow bolt engaging edge having threads 10 which conform to the threads 4 on the inside of the extension 2. That is to say, if the inner threads 4 are righthand threads, the threads 10 on the lugs are righthand threads. When these lugs are disposed in their respective seats at the top of the extension 2, the lower ends thereof are free to swing inwardly toward the bore of the nut to engage with the threads on the fastening bolt adapted to receive the nut, such bolt being designated 11 in the drawing. It is to be understood that while I have illustrated a pair of these wedges, it is obvious that a single one may be employed.

To cause the lugs 8 to be shifted in the manner above described, I provide a clamping nut 12 which is designed to be internally threaded to conform to the threads 3 on the extension 2. It is to be particularly noted that the extension 2 is cylindrical in form so that the nut 12 may be screwed freely upon said extension to its operating position shown most clearly in Figure 3, and, as it is moved downwardly upon the extension, it coacts with the lugs 8 and gradually forces said lugs to swing inwardly until the threads 10 bite into the threads of the bolt sufficiently to produce an interlock between the locking device and the bolt designed to clamp the parts of an object, such as the plates 13, between the nut 1 and the head of the bolt 11.

As clearly shown in Figure 1 of the drawing, the outer face of the nut 1 adjacent the extension 2 is provided with a lug or stop 14, and the inner face of the clamping nut 12, as shown in Figure 3, is provided with a recess forming a stop shoulder 15. These elements 14 and 15 act in conjunction with a locking washer 16 which is of the split type and shaped with its ends spaced apart, as shown clearly in Figure 1, so that one end of said locking nut will engage with the shoulder 15, thereby preventing the clamping nut 12 from moving in the reverse direction to its clamping movement, as will be clearly understood by reference to Figure 3 of the drawing.

The operation of the device will be clear from the foregoing statement. Summarizing the same, when the bolt 11 has been passed through the apertures 13′ in the parts to be clamped together, the nut 1 is screwed upon the threaded end of the bolt until it is in clamping relation to the parts 13. The lugs 8 having been seated in the extension slots 5 the locking washer 16 is slipped upon the extension and the clamping nut thereupon is applied to said extension and screwed home. In this operation, the wedges or lugs 8 are swung inwardly into contact with the threads of the bolt 11, and the clamping nut 12 is locked against unscrewing movement by the locking washer 16.

If it is desired to remove the nut 1 from the bolt, a screw-driver or similar implement may be inserted into the recess 17 adjacent the shoulder 15 on the clamping nut and by a twisting action the end of the locking washer 16 engaging said shoulder may be disengaged therefrom sufficiently to enable the nut 12 to be unscrewed from the extension 2. This will relieve the pressure against the wedges 8 and the nut 1 may then be unscrewed. The wedges are preferably made of tempered steel, and the threads 10 on the inner faces thereof for this reason may slightly mutilate the threads of the bolt but not sufficiently so to prevent the nut 1 from being unscrewed in the usual manner where threads have been slightly mutilated. The threads 10 of the wedges may be in the nature of fine projections if such are preferred instead of the threadlike projections 10 shown in the drawing. By this cooperation of parts a very effective clamping and locking action may be produced by the device.

The resilient neck portion 8a permits a degree of relative movement of the threaded body portion of the wedges or lugs 8 with respect to the top portion disposed in the seats 6—6 thus preventing displacement of the projections 7—7 from their seats in the top of the nut 1, or danger of breakage of the lugs as the clamping nut is screwed up tight.

While the specific details of construction have been herein shown and described, the invention is not confined thereto as alterations may be made without departing from the spirit thereof as defined by the appended claims.

What I claim as new and desire to secure by Letters Patent is:

1. A nut locking device of the class described comprising a nut having a threaded supporting extension and a slot in said extension, a lug mounted in said slot and secured at one end in the extension against movement inwardly of said slot, the other end being free to swing about the secured end transversely of the nut, and a clamping nut mounted upon said extension and engageable with the lug to effect swinging movement of the free end thereof.

2. A nut locking device of the class described comprising a clamping nut having a cylindrical threaded extension projecting from its outer face, said extension being slotted transversely and the walls of the slot at the outer end being provided with lug-receiving seats, a wedge-shaped lug mounted in said seats, said lug being provided with a threaded face conforming to the threads of the extension and bolt thread engaging projections upon its inner face, and a clamping nut carried by said extension to engage with the lug and swing the same inwardly of the nut to establish interlocking engagement with a bolt receiving said nut.

3. A nut locking device of the class described comprising a nut having a threaded extension projecting from the outer face thereof, wedge members pivotally mounted on said extension for movement inwardly at one end thereof, a clamping nut adapted to be screwed upon said extension to actuate the wedge members, and a lock washer mounted upon said extension between the nut and the clamping nut.

4. A nut locking device of the class described comprising a nut having a threaded extension projecting from the outer face thereof, wedge members pivotally mounted at one end on said extension for movement inwardly thereof at the other end, a clamping nut adapted to be screwed upon said extension to actuate the wedge members, and a lock washer mounted upon said extension between the nut and the clamping nut, said nut and clamping nut being provided with stop means engaging the washer to prevent unscrewing movement of the clamping nut.

5. A nut locking device of the class described comprising a nut having a cylindrical threaded extension projecting from its outer face, said extension having slots therein, lug members mounted in said slots constructed and arranged to freely swing at one end inwardly of the slots, a clamping nut threadingly receiving the extension, a split lock washer mounted upon said extension between said nuts, each of said nuts having a stop shoulder engageable with the ends of the locking washer for preventing unscrewing movement of the clamping nut.

6. A nut locking device of the class described comprising a nut having a threaded extension projecting from its outer face, said extension having slots therein and associated lug supporting seats in its outer end, lug members mounted at one end on said seats and disposed in said slots for movement at the other end inwardly of the nut, said lug members having an intermediate resilient neck portion, and a clamping nut disposed on said threaded extension for moving said lug members inwardly.

7. A nut locking device of the class described comprising a nut having a supporting extension, a bolt engaging member supported at its top by said extension so as to be swingable, and means carried by said extension for swinging said engaging member into locking engagement with a bolt receiving said nut, said bolt engaging member comprising a lug having a projection at one end pivotally mounting said member on the nut extension to swing transversely of the nut, and the means for swinging said lug consisting of a clamping member movable longitudinally of the extension to engage and swing the free end of the lug on its pivot into locking engagement with a bolt receiving the nut.

8. A nut locking device of the class described comprising a nut having a supporting extension, a bolt engaging member supported at its top by said extension so as to be swingable, means carried by said extension for swinging said engaging member into locking engagement with a bolt receiving said nut, and means intermediate the nut and the means for swinging the engaging member for holding the last named means in operative position against displacement from the extension.

TOBIAS JOHNSEN.